United States Patent [19]

Pennisi

[11] Patent Number: 4,639,210

[45] Date of Patent: Jan. 27, 1987

[54] PROCESS FOR MONITORING THE HEAT GRADIENT IN A HEAT-PRODUCING SYSTEM

[76] Inventor: Licio Pennisi, R.D. 1, Box 99, Alfred Station, N.Y. 14803

[21] Appl. No.: 845,968

[22] Filed: Mar. 31, 1986

[51] Int. Cl.$^4$ ............................................. F23D 5/12
[52] U.S. Cl. .................................... 431/13; 110/185; 110/193
[58] Field of Search ...................... 431/13, 14, 20, 22, 431/23, 33, 77, 202; 110/185, 193; 236/15 E

[56] References Cited

U.S. PATENT DOCUMENTS 3,667,408  6/1972  Jasinsky et al. ................. 431/202 X
4,102,627  7/1978  Reed et al. ........................ 431/20 X

FOREIGN PATENT DOCUMENTS 3343301  6/1985  Fed. Rep. of Germany ...... 110/193

Primary Examiner—Edward G. Favors
Attorney, Agent, or Firm—Howard J. Greenwald

[57] ABSTRACT

A process for monitoring the heat gradient in a heat-producing system is disclosed. Also disclosed is an apparatus which can be used in the process. In this process, at least three heat sensors, which are situated downstream from a heat source, determine the temperature of the exhaust gas from the heat source. Each of the heat sensors used produces a substantially identical response to a given temperature. The output from each two sequential heat sensors is operatively connected to an indicator, which evaluates whether the downstream heat sensor is reporting a temperature lower than the upstream heat sensor; if the downstream heat sensor does report a lower temperature than the upstream heat sensor, then the indicator reads positive; but if the downstream heat sensor reports a highter temperature than the upstream heat sensor, then the indicator reads negative. The output from each indicator is fed to a switching device, which is activated only if and when any one of the indicators in the system reads negative. When the switching device is turned on, an alarm is activated.

20 Claims, 3 Drawing Figures

PROCESS FOR MONITORING THE HEAT GRADIENT IN A HEAT-PRODUCING SYSTEM

FIELD OF THE INVENTION

A process for monitoring the heat gradient in a heat-producing system in which at least three heat sensors, which are situated downstream from a heat source, determine the temperature of the exhaust gas from the heat source and the data from these sensors is analyzed to determine whether a fire hazard exists.

DESCRIPTION OF THE PRIOR ART

U.S. Pat. No. 3,728,615 discloses a firm alarm system comprised of detector tubes 12 and 14. These detector tubes do not have substantially identical responses to the exhaust gas being measured, for one of the tubes is ". . . partially sealed from the ambient atmosphere by means of shield enclosure 24 . . . " whereas the other tube is not so shielded. The use of heat-sensing detector tubes with different properties does not allow one to readily determine whether the heat gradient in a combustion system exhaust gas is continually decreasing in temperature.

U.S. Pat. No. 3,112,880 discloses a method for controlling the heat flowing from a burner to a passageway in the heater. Although the use of two temperature recorders is disclosed, there is no disclosure of a process of activating a fire alarm system when any downstream point in the heat gradient of an exhaust gas has a temeprature higher than any point upstream of it in the gradient.

SUMMARY OF THE INVENTION

A process for monitoring the heat gradient in a heat-producing system is disclosed in which at least three heat sensors, which are situated downstream from a heat source, determine the relative temperature of the exhaust gas from the heat source. Each of the heat sensors used produces a substantially identical response to a given temperature. The output from each two sequential heat sensors is operatively connected to an indicator, which evaluates whether the downstream heat sensor is reporting a temperature lower than the upstream heat sensor; if the downstream heat sensor does report a temperature lower than the upstream heat sensor, then the indicator reads positive; but if the downstream heat sensor reports a higher temperature than the upstream heat sensor, the indicator reads negative. The output from each indicator is fed to a switching device which is activated only if and when any one of the indicators in the system reads negative. When the switching device is turned on, an alarm is activated.

BRIEF DESCRIPTION OF THE DRAWINGS

The present invention will be more fully understood by reference to the following detailed description thereof, when read in conjunction with the attached drawings, wherein like reference numerals refer to like elements and wherein.

DESCRIPTION OF THE PREFERRED EMBODIMENTS

The present invention provides a process and an apparatus for measuring the temperature of an exhaust gas in order to determine whether each portion of the gas is at a lower temperature than a corresponding upstream portion. At least three temperature-sensing devices (such as thermocouples) are placed at various points along the gas stream; for any given temperature, each of the temperature-sensing devices has a response which is substantially identical to each of the other temperature-sensing devices. The output from each two sequential temperature-sensing devices (such, as, e.g., sequential thermocouples 18 and 22, and 22 and 20, in FIG. 1) is fed to an indicator; the indicator will read positive when the downstream thermocouple reports a temperature lower than the upstream one, and it will read negative when the downstream thermocouple reports a temperature higher than the upstream one. Each of the indicator devices is operatively connected to a switching device(such as a NAND gate) which activates an alarm whenever any of the indicators is negative.

Figure 1:
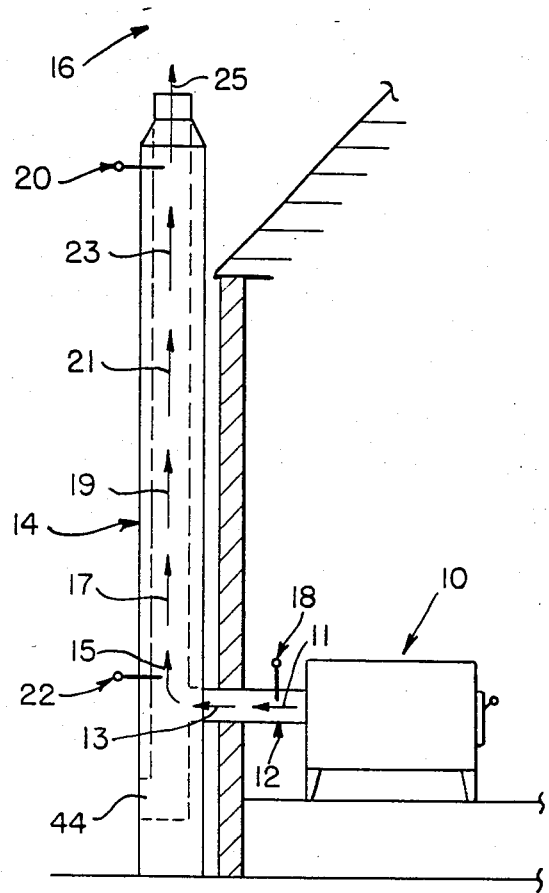
FIG. 1 is a fragmentary side elevational view of one embodiment of the invention.

Referring now to the figures, FIG. 1 illustrates one preferred embodiment of applicant's invention. As is shown in FIG. 1, heat source 10 burns a combustible carbonaceous fuel (not shown) and produces exhaust gas (not shown); the path of the exhaust gas, from upstream(the heat source) to downstream(the atmosphere) is shown by arrows 11, 13, 15, 17, 19, 21, 23, and 25; the exhaust gas is vented through pipe 12 and chimney 14 to the atmosphere 16. A temperature gradient(not shown) exists between the point at which the exhaust gas initially leaves heat source 10 and enters pipe 12(at which time it is relatively hot) and the point at which the gas vents to the atmosphere 16(at which time it is substantially cooler). It is this temperature gradient which the temperature gradient monitoring system of applicant's invention is designed to evaluate. This monitoring system is comprised of at least three temperature sensors which are situated at designated points in or near the flow of the exhaust gas from heat source 10 to atmosphere 16. Thus, as is illustrated in FIG. 1, heat sensor 18 is placed within pipe 12, at a point at which the exhaust gas is relatively hot; heat sensor is placed within chimney 14 at a point at which the exhaust gas is relatively cool; and heat sensor 22 is placed intermediate heat sensor 18 and heat sensor 20.

As is indicated above, the temperature-sensing devices(such as thermocouples) are placed in sequential relationship with each other. As used in this specification, the term "sequential" refers to following in order from upstream to downstream. Thus, referring to FIG. 1, as one goes upstream(from heat source 10) to downstream (to atmosphere 16), thermocouples 18, 22, and 20 are sequentially arranged; 22 is downstream of 18 in the heat gradient, and 20 is downstream of 22 in the heat gradient. Thus, thermocouples 18 and 22 are sequentially arranged. Thus, thermocouples 22 and 20 are sequentially arranged. However, thermocouples 18, 20, and 22 are not "sequential"; for this is not the order they appear in in the upstream--downstream heat gradient sequence.

Heat source 10 can be any heat-producing system. Thus, by way of illustration and not limitation, heat source 10 can be a heat-producing chemical system involving one or more exothermic reactions, an atomic reactor, or a combustion system. In one preferred embodiment, heat source 10 is a combustion system in which a carbonaceous(carbon-containing) fuel is burned. It is preferred that the carbonaceous fuel being burned in heat source 10 be selected from the group consisting of oil, coal, and natural gas. However, other carbonaceous fuels may also be burned in heat source 10 such as, e.g., coal-water slurry, coke-water slurry, and the like.

In the heat gradient monitoring system of applicant's invention, at least three heat sensors must be used. The use of at least three heat sensors allows the system to operate quickly and efficiently with a high degree of sensitivity. In general, the longer the heat gradient to be monitored, the more heat sensors can advantageously be used. Thus, e.g. in some embodiments 4, 5, 6, 7, 8, 9, 10, or more heat sensors can be used in the system.

In general, any device which will generate an electrical signal in response to heat can be used as a heat sensor in applicant's heat gradient monitoring system. The heat sensor can be comprised of a temperature measuring instrument (such as, e.g., a thermometer, a resistance thermometer, or a pyrometer) whose output will be converted by an auxiliary electronic device into an electrical signal. Alternatively, the heat sensor may be a thermocouple. The use of a thermocouple is preferred, for in response to heat it genrates an electrical signal directly without the need for an auxiliary power supply and/or electronic device.

Some suitable temperature measuring instruments are disclosed on pages 22-23 to 22-37 of R. H. Perry's and C. H. Chilton's "Chemical Engineers' Handbook," Fifth Edition (McGraw-Hill, Inc., New York, 1973), the disclosure of which is hereby incorporated by reference into this specification. Thus, e.g., suitable temperature measuring instruments include thermocouples, resistance thermometers, filled-system thermometers, bimetal thermometers, liquid-in-glass thermometers, and pyrometers; when any of these (with the exception of the thermocouple, which does not require auxiliary systems) is connected to an auxiliary electronic device which converts its output into an electricl signal, the temperature measuring unit so connected can be used as a heat sensor in applicant's invention.

It is preferred that the heat sensor be either a resistance temperature detector(which requires an auxiliary electronic device) or a thermocouple (which does not require such auxiliary device). The most preferred heat sensor is a thermocouple.

As is well known to those skilled in the art, a thermocouple is a device that uses the voltage developed by the junction of two dissimilar metals to measure temperature difference. Two wires of dissimilar metals welded together make up the basic thermocouple. One junction, called the sensing or measuring junction, is placed at the point where temperature is to be measured. The other junction, called the reference or cold junction, is maintained at a known reference temperature. The voltage developed between the two junctions is proportional to the difference between the temperatures of the two junctions; it is caused by the "Seebeck effect," discovered in 1821, in which an electric current flows in a continuous circuit of two different metallic wires if the two junctions are at different temperatures. Thermocouples are well known to those skilled in the art and are described in, e.g., pages 584–585 of Volume 13 of the "McGraw-Hill Encyclopedia of Science & Technology" (McGraw-Hill, Inc., New York, 1977), the disclosure of which is hereby incorporated by reference into this specification.

Regardless of which heat sensor is used in applicant's system, it is essential that, for any given temperature, it have an output which is substantially identical to that of each other sensor used in the system. Thus, although one can use different temperature measuring instruments which have the same output, it is preferred to use the same type temperature measuring instrument for each sensor. In a preferred embodiment, the same type and model of thermocouple is used for each heat sensor in the system.

In applicant's system, each of the heat sensors is disposed downstream of heat source 10. As used in this specification, the term "downstream" refers to the direction of the flow of exhaust gas from heat source 10 to atmosphere 16; one point is said to be downstream of another point if the former point is further along said stream than is the latter point. On the other hand, one point is said to be upstream of another point if the former point is closer to the heat soruce 10 than is the latter point.

In applicant's system, the first heat sensor(such as, e.g., heat sensor 18 in FIG. 1) is disposed downstream of heat source 10 but upstream of the other heat sensors(such as heat sensors 22 and 20 in FIG. 1). The last heat sensor(see heat sensor 20 of FIG. 1.) is preferably located near the end of the gradient, downstream of both heat sensors 18 and 22; whereas the first heat sensor is preferably located near the beginning of the gradient. One or more intermediate heat sensors (see, e.g., heat sensor 22 of FIG. 1) is/are located downstream of the first heat sensor 18 and upstream of the last heat sensor 20.

In the remainder of this specification, the heat sensor will be described by reference to a thermocouple, it being understood that other heat sensors can also be used.

Figure 2:
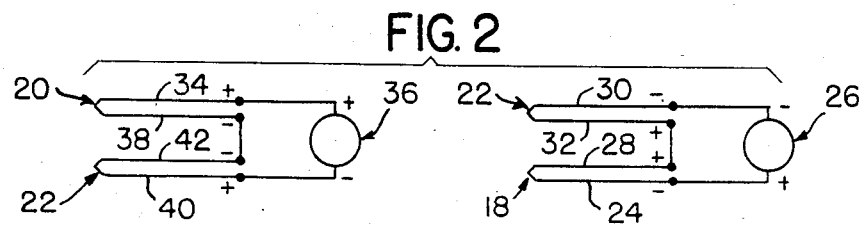
FIG. 2 is a schematic illustrating how two thermocouples are connected to an indicator/voltmeter in one embodiment of the invention.

Referring now to FIG. 2, thermocouple 18 is connected by wire 24 to indicator 26 and by wire 28 to thermocouple 22. Thermocouple 22 is conected by wire 30 to indicator 26 and by wire 32 to thermocouple 18. Thermocouple 20 is connected by wire 34 to indicator 36 and by wire 38 to thermocouple 22. Thermocouple 22 is connected by wire 40 to indicator 36 and by wire 42 to thermocouple 20.

It is preferred that wires 24, 28, 30, 32, 34, 38, 40, and 42 which connect the thermocouples with each other and with indicators 26 and/or 36 be made from thermocouple extension wire. As used in this specification, the term "thermocouple extension wire" includes wire whose properties are substantially identical to the thermocouple lead to which it is connected. Thus, e.g., the thermocouple extension wire can be identical to the wire used for the thermocouple. Alternatively, the thermocouple extension wire may be made from compensating thermocouple extension wire which, although it consists of different material than the thermocouple, has substantially identical properties.

Indicators 26 and 36 can be any electrical or electronic device which can compare the electrical outputs from sequential thermocouples in the system (such as thermocouples 18 and 22, or 22 and 20) and indicate which output is greater. In the embodiment illustrated in FIGS. 2 and 3, indicators 26 and 36 are voltmeters.

Referring again to FIG. 2, when, as is normal, thermocouple 18 is subjected to more heat than is thermocouple 22, the electron flow through wire 24 from thermocouple 18 exceeds the electron flow through wire 30 from thermocouple 22, and indicator/voltmeter 26 reads positive. Similarly, when, as is normal, thermocouple 22 is subjected to more heat than is thermocouple 20, the electron flow through wire 42(from thermocouple 22) exceeds the electron flow through wire 38(from thermocouple 20), and indicator/voltmeter 36 reads positive. As long as the temperature gradient in the combustion system is the way it is supposed to be, with the vent gas continuously becoming cooler as it approaches the atmosphere, then indicators 26 and 36 will read positive. If, however, there is a fire between sensors 18 and 22 and/or between sensors 22 and 20, one or both of indicators 26 and 36 will read negative, and this negative reading will be noted by device 38 which will activate alarm 40.

Figure 3:
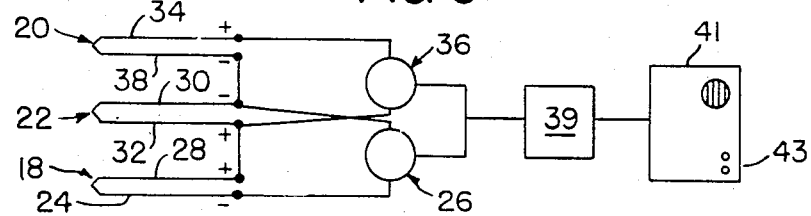
FIG. 3 is a schematic of one circuit which can be used in one of the preferred embodiments of the invention.

Referring now to FIG. 3, there is disclosed thermocouples 18, 22, and 20 connected to indicators 26 and 36. As will be apparent to those skilled in the art, additional thermocouples can also be utilized in the system; each additional thermocouple so utilized will require the presence of an additional indicator/voltmeter(such as indicators/voltmeters 26 and 36) and an additional lead from the additional indicator/voltmeter to device 38.

Switching device 39 can be comprised of a switching circuit which will switch on alarm only when the output from each and every indicator/voltmeter is not positive. In the circuit shown in FIG. 3, switching device 39 will activate alarm 41 if either or both of indicators 26 and 36 is negative. In a situation, e.g., where five thermocouples and four indicator/voltmeters are used(not shown), switching device 39 will activate alarm 41 if one, two, three, or all of the indicator/voltmeters are negative.

The switching device 39 may be comprised of a switching circuit, which usually consists of conducting paths interconnecting discrete-valued electrical devices. Some suitable switching circuits are described on pages 806–824 of the "McGraw-Hill Encyclopedia of electronics and Computers" (McGraw-Hill, Inc., New York, 1982), the disclosure of which is hereby incorporated by reference into this specification.

When switching device 39 is activated (by any one of the indicator/voltmeters being negative), it will turn on alarm 41. Alarm 41 can be any of the alarms well known to those skilled in the art. Thus, e.g., alarm 41 can be a sonic alarm. Thus, e.g., alarm 41 can contain an output 43 to a remote alarm(not shown).

It will be appreciated that, although the invention has been described with reference to the specific embodiments described in FIGS. 1, 2, and 3, other embodiments are within the scope of the invention. Thus, e.g., although heat source 10 has been depicted in FIG. 1 as a stove, any means for generating heat can be used. For example, a means for generating heat and flue gases can be used as the heat source. Thus, e.g., any of the furnaces described on pages 606–612 of Volume 5 of the "McGraw-Hill Encyclopedia of Science & Technology" (McGraw-Hill, Inc., 1977), the disclosure of which is hereby incorporated by reference into this specification, can be used.

Although a pipe has been depicted in FIG. 1, any other means communicating with heat source 10 to facilitate the passage of exhaust gas from heat source 10 to the atmosphere 16 can be used.

FIG. 1 depicts chimney 14 comprised of trap 44. In general, any vertical, hollow structure of masonry, steel, or concrete which is built to convey gaseous products of combustion from a building can be used to vent the exhaust gas from heat source 10 to the atmosphere 16. Instead of, or in addition to, said chimney, one can use an exhaust gas pipe. Any other means for conveying the exhaust gas from heat source 10 to atmosphere 16 can also be used.

FIG. 1 depicts thermocouples 18, 22, and 20 situated at various points along the heat gradient produced by heat source 10, but it does not depict means for connecting the thermocouples with indicators 26 and 36. Any means known to those skilled in the art can be used to operatively connect the thermocouples with the indicators. Thus, for example, each of the thermocouples can have its output electrically connected with an amplifier, and the amplified output from the thermocouples can then be electrically connected with the indicators; suitable means for amplifying the outputs of the thermocouples are disclosed on pages 386–391 of Volume 1 of the "McGraw-Hill Encyclopedia of Science & Technology" (McGraw-Hill, Inc., New York, 1977), the disclosure of which is hereby incorporated by reference into this specification.

Although FIGS. 1, 2, and 3 depict thermocouples, any other means for depicting whether a continuously decreasing heat gradient exists in the combustion system can be used in this invention. As used in this specification, the term "continuously decreasing heat gradient" refers to a system wherein, as the exhaust gas travels further away from the heat source, the temperature of the exhaust gas continuously decreases. Any combustion system wherein, at any given point, the temperature of the exhaust gas is substantially higher than it was at a prior, downstream point, does not have a "continuously decreasing heat gradient."

One means of operatively connecting the output of the thermocouples with the indicators 26 and 36 is to operatively connect the output of the thermocouples to one or more transmitters, transmit said output to one ore more receivers, and operatively connect the output from the receivers to one or more of the indicators. Another means of operatively connecting the output of the thermocouples with the indicators is to directly connect the thermocouples, by means of thermocouple extension wire, with the indicators. Regardless of whether one uses indirect means of connecting the output of the thermocouples with the indicators (such as the transmitter--receiver system) or direct means(such as extension wire), or a combination of indirect or direct means, one may utilize amplifiers in the system to increase the output of the thermocouples.

Indicators 26 and 36 determine whether the temperature sensed by each of the thermocouples in the system is lower than the temperature sensed by each other thermocouple which is upstream of the reference thermocouple. Although FIGS. 2. and 3. disclose that this determination may be made by electrical means, any means may be used in the invention. Thus, e.g., indicators 26 and 36 may be operatively connected to the thermocouples in any manner which allows them to make such determination, be it electrical means, physical means, chemical means, mechanical means, or any other suitable means.

Switching device 39 can be any suitable device, utilizing electronic and/or other means, for evaluating whether each of the indicators(such as indicators 26 and 36) are positive or negative. When all of the indicators are positive, this indicates that every heat sensor in the system is reported a temperature lower than that reported by all heat sensors upstream of it, and no alarm will be sounded by the system. When, however, any one or more of the indicators is negative, at least one of the heat sensors is reported a temperature higher than that reported by the heat sensor upstream of it, and switching device 39 will activate alarm 41.

In one preferred embodiment, switching device 39 utilizes a gate circuit to determine whether conditions are suitable for switching on alarm 41. Any of the gate circuits well known to those skilled in the art can be so used. Thus, e.g., the gate circuits disclosed on pages 689–695 of Bernard Grob's "Basic Electronics," Fourth Edition (McGraw-Hill, Inc., New York, 1977), the disclosure of which is hereby incorporated by reference into this specification, can be used. Thus, e.g., a NAND gate circuit can be used.

The terms I have employed are used as terms of description and not limitation, and I have no intention, in the use of such terms and expressions, of excluding any equivalents of the features shown and described or portions thereof, but recognize that various modifications are possible within the scope of the invention claimed.

I claim:

1. A process for monitoring the heat gradient in a system comprised of a heat source which produces exhaust gas, and means for venting said exhaust gas from the heat source to the atmosphere, wherein said process comprises the steps of:
   (a) providing at least three heat sensors wherein, for any given temperature, each of said heat sensors has an output which is substantially identical to the outputs of each of the other heat sensors;
   (b) disposing each of said heat sensors downstream of said heat source at different points along the path of said exhaust gas in sequential relationship with each other;
   (c) providing means for determining, for each two sequential heat sensors, whether the temperature reported by the downstream heat sensor is lower than the temperature reported by the upstream heat sensor;
   (d) providing switching means for activating an alarm whenever the temperature reported by a downstream heat sensor is lower than the temperature reported by an upstream heat sensor;
   (e) providing an alarm which is operatively connected to said switching means;
   (f) operatively connecting each two sequential heat sensors with said means for determining whether the temperature reported by said downstream heat sensor is lower than the temperature reported by said upstream heat sensor; and
   (g) operatively connecting said means for determining whether the temperature reported by the downstream heat sensor is lower than the temperature reported by the upstream heat sensor with said switching means;

whereby, whenever any downstream heat sensor reports a temperature which is higher than that temperature reported by the heat sensor which is upstream of it, an alarm is activated.

2. The process as recited in claim 1, wherein said system is a combustion system.

3. The process as recited in claim 2, wherein said heat sensors are thermocouples.

4. The process as recited in claim 3, wherein said means for venting exhaust gas from the heat source to the atmosphere is comprised of a chimney.

5. The process as recited in claim 4, wherein said heat source is a furnace.

6. The process as recited in claim 5, wherein said furnace is a gas furnace.

7. The process as recited in claim 5, wherein said furnace is an oil furnace.

8. The process as recited in claim 5, wherein said means for venting exhaust gas from the heat source to the atmosphere is comprised of a pipe communicating with said heat source and a chimney communicating with said pipe.

9. The process as recited in claim 3, wherein said means for determining, for each two sequential heat sensors, whether the temperature reported by the downstream heat sensor is lower than the temperature reported by the upstream heat sensor, is a voltmeter.

10. The process as recited in claim 9, wherein said switching means is comprised of a gate circuit.

11. The process as recited in claim 10, wherein each set of sequential thermocouples is connected with voltmeter by thermocouple extension wire.

12. The process as recited in claim 11, wherein said gate circuit is a NAND gate circuit.

13. An apparatus for monitoring the heat gradient in a system comprised of a heat source which produces exhaust gas, and means for ventilating said exhaust gas from the heat source to the atmosphere, wherein said apparatus comprises:
   (a) at least three heat sensors wherein, for any given temperature, each of said heat sensors has an output which is substantially identical to the ouptputs of the other heat sensors;
   (b) means for determining whether the temperature reported by one of said heat sensors is lower than the temperature reported by another of said heat sensors; and
   (c) means for activating an alarm whenever the temperature reported by a specified one of said heat sensors is lower than the temperature reported by a specified other of said heat sensors.

14. The apparatus as recited in claim 13, wherein said system is a combustion system.

15. The apparatus as recited in claim 14, wherein said heat sensors are thermocouples.

16. The apparatus as recited in claim 15, wherein said means for venting exhaust gas from the heat source to the atmosphere is comprised of a chimney.

17. The apparatus as recited in claim 16, wherein said heat source is a furnace.

18. The apparatus as recited in claim 17, wherein said furnace is a gas furnace.

19. The apparatus as recited in claim 17, wherein said furnace is an oil furnace.

20. The apparatus as recited in claim 17, wherein said means for venting exhaust gas from the heat source to the atmosphere is comprised of a pipe communicating with said heat source and a chimney communicating with said pipe.

* * * * *